United States Patent [19]

Benenati

[11] 4,351,144

[45] * Sep. 28, 1982

[54] COMMINUTING POWERED LAWN MOWER

[76] Inventor: Salvatore Benenati, 77 Woodside Dr., Red Bank, N.J. 07701

[*] Notice: The portion of the term of this patent subsequent to Apr. 21, 1998, has been disclaimed.

[21] Appl. No.: 249,450

[22] Filed: Mar. 31, 1981

Related U.S. Application Data

[63] Continuation-in-part of Ser. No. 51,025, Jun. 22, 1979, Pat. No. 4,262,476.

[51] Int. Cl.³ .......................................... A01D 55/18
[52] U.S. Cl. .................................................. 56/295
[58] Field of Search ........................ 56/295, 255, 16.9

[56] References Cited

U.S. PATENT DOCUMENTS 3,176,455  4/1965  Buchanan .............................. 56/295
4,262,476  4/1981  Benenati ................................ 56/295

*Primary Examiner*—Jay N. Eskovitz
*Attorney, Agent, or Firm*—Michael Ebert

[57] ABSTRACT

A powered lawn mower adapted to slice grass into small pieces and to disperse these pieces on the lawn to provide a mulch therefor to enrich the soil without impairing the appearance of the lawn. The mower includes a multi-bladed, multi-level rotor having a central hub which is driven to rotate about a vertical axis. Three sets of blades radiate from the hub in staggered relation, the first set being at the level of the hub and having the longest blade length. The second set is a step below the hub and has an intermediate blade length, and the third set is a step below the second and has the shortest blade length. The leading edges of the blades are pitched to create an air foil effect producing an updraft to raise the grass and thereby facilitate a cutting action. As the mower is advanced in a horizontal path toward unmown grass, first the upper portions of the grass blades are sliced by the rotating long blades of the first set, then the intermediate portions of the grass blades are sliced by the shorter rotating blades of the second set, and finally the stubble portions of the grass blades are sliced by the still shorter rotating blades of the third set.

5 Claims, 6 Drawing Figures

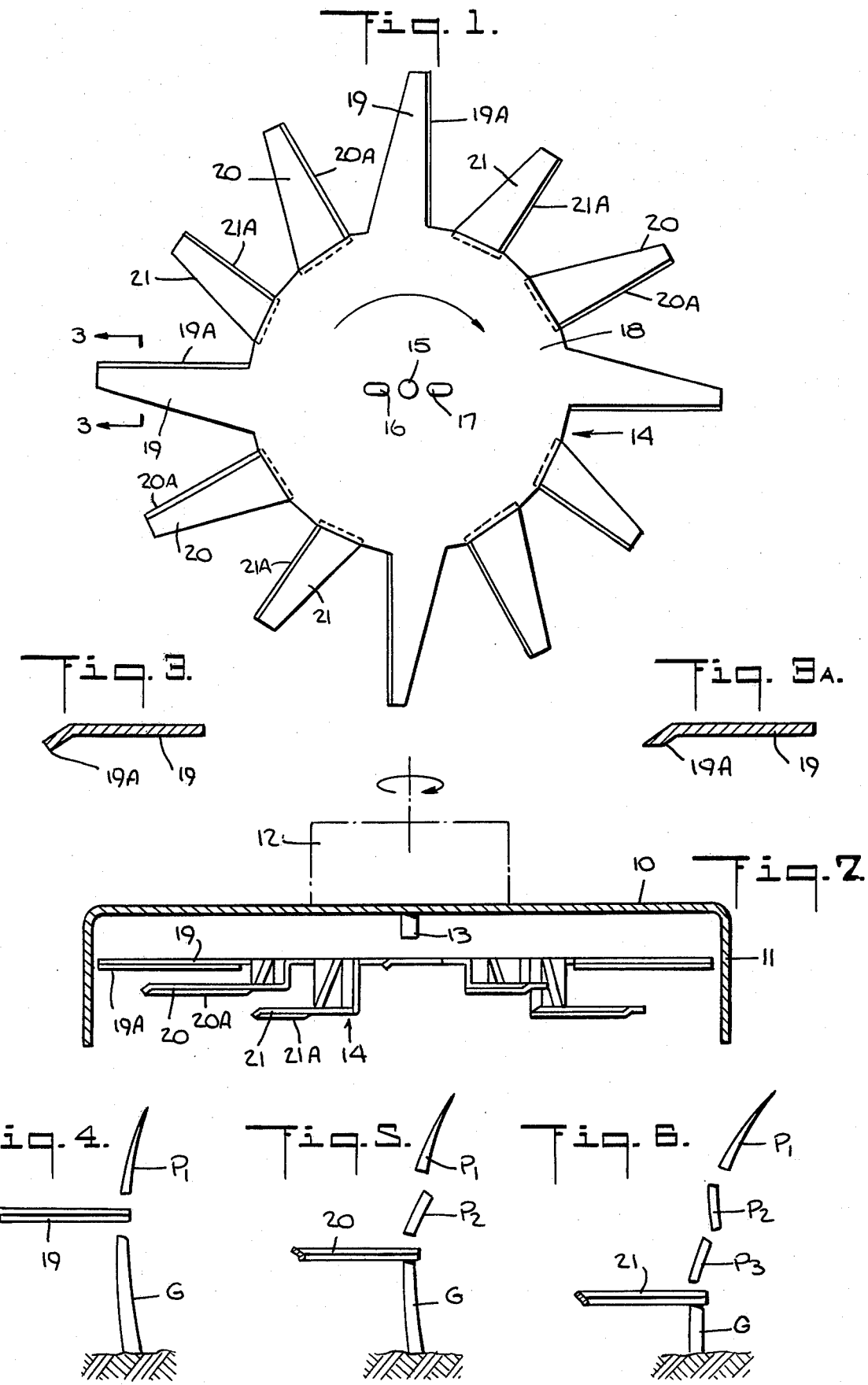

COMMINUTING POWERED LAWN MOWER

RELATED APPLICATION

This application is a continuation-in-part of my co-pending application Ser. No. 051,025, filed June 22, 1979, of the same title now U.S. Pat. No. 4,262,476.

BACKGROUND OF INVENTION

1. Field of Invention

This invention relates generally to rotary powered lawn mowers, and more particularly to a multi-bladed, multi-level lawn mower rotor adapted to slice grass engaged thereby into small pieces which are deposited on the lawn to provide a mulch therefor.

2. Prior Art

The typical powered lawn mower cuts grass into large pieces which are deposited on the lawn. It becomes necessary, therefore, to rake and collect the grass cuttings as well as leaves fallen on the lawn and to dispose of this waste material. In some cases, the mower is arranged to draw the cuttings into a bag and thereby simplify the disposal procedure.

It is often desirable that a rotary power lawn mower be capable not only of cutting grass but also of chopping the grass clippings, leaves and other organic debris lying in the path of the mower into finely cut pieces to serve as mulch about the grass roots. By finely comminuting grass and leaves and spreading the finely cut organic material over the lawn, one not only enhances the growth conditions of the lawn, but the need for raking, collecting and disposing of grass cuttings is obviated.

To this end, the prior patent to Clark, U.S. Pat. No. 2,663,984, discloses a powered lawn mower which includes a screen disposed within the casing above the rotating sickle blade and against which the blade acts to project grass and leaf cuttings for comminution. To impel the cuttings against the screen for more effective fragmentation, the sickle is provided with fan blades.

The difficulty with the comminuting lawn mower of Clark, apart from its relative mechanical complexity is that the clippings tend to accumulate inside the blade housing and to stall the mower. Other forms of comminuting types of powered lawn mowers which suffer for similar drawbacks are disclosed in the following patents: Hass, U.S. Pat. No. 4,083,166; Anderson, U.S. Pat. No. 3,703,071, and Pursel, U.S. Pat. No. 3,797,212.

SUMMARY OF INVENTION

In view of the foregoing, the main object of this invention is to provide a comminuting power lawn mower of simple and efficient design adapted to slice grass engaged thereby into small pieces. These pieces are dispersed to provide a mulch for enriching the soil without, however, impairing the appearance of the lawn.

More particularly, an object of the invention is to provide in a lawn mower of the above type a multi-bladed, multi-level driven rotor which may be used with existing types of powered lawn mowers to readily replace standard sickle-type blades, the rotor structure being such as to produce an updraft which serves to raise the blades of grass to facilitate the cutting action and to eject the chopped particles.

A significant feature of a mower in accordance with the invention is that it acts to slice each blade of grass engaged thereby into at least three pieces. Each piece, as it is being ejected by the flow of air created by the leading edges of the mower blades, is chopped several times by the rotating blades which thereafter strike the floating piece, so that the pieces are reduced to fine particles which do not bunch up or agglomerate as in some prior arrangements, but are more or less uniformly dispersed over the lawn and are concealed by the shorn grass. In this way, the resultant mulch of fine particles does not disfigure the appearance of the lawn.

Also an object of this invention is to provide a multi-bladed, multi-level rotor for a lawn mower which can be mass-produced at relatively low cost.

Briefly stated, these objects are attained in a power mower in accordance with the invention which includes a multi-bladed, multi-level rotor having a horizontal central hub driven to rotate about a vertical axis, from which hub three sets of blades radiate in staggered relation. The first set is at the level of the hub and has the longest blade length; the second is a step below the hub and has an intermediate blade length; and the third set is a step below the second and has the shortest blade length.

The leading edges of the blades in all three sets are pitched to create an air foil effect such that when the rotor is driven, an updraft is produced which raises the grass and facilitates a cutting action. As the mower is advanced in a horizontal path toward unmown grass, the first set of rotating blades which have the longest reach act to slice off the upper portions of the grass blades. Then the second set of rotating blades which have an intermediate reach slice off the intermediate portions of the grass blades. Finally, the remaining stubble portion of the grass blades are sliced by the third set of blades which have the shortest reach. Thus each grass blade is subjected to three cuts in succession to produce three pieces whose sizes are determined by the steps between the rotor blade levels.

OUTLINE OF DRAWINGS

For a better understanding of the invention as well as well as other objects and further features thereof, reference is made to the following detailed description to be read in conjunction with the accompanying drawings, wherein:

FIG. 1 is a plan view of a multi-bladed, multi-level rotor for a powered lawn mower in accordance with the invention;

FIG. 2 is an end view of the rotor;

FIG. 3 is a section taken in the plane indicated by lines 3—3 in FIG. 1; FIG. 3A is the same section in a second embodiment of the invention;

FIG. 4 shows how a blade of grass is cut by the top level rotor blade;

FIG. 5 shows how the same grass blade is thereafter cut by the intermediate level rotor blade; and FIG. 6 shows how the lowest level rotor blade cuts the remaining portion of the same grass blade.

DESCRIPTION OF INVENTION

Referring now to FIGS. 1, 2 and 3, a powered lawn mower in accordance with the invention includes the usual inverted wheel-mounted housing 10 open at a bottom and provided with a vertical skirt or flange 11. Supported on housing 10 is a standard lawn-mower motor 12 which includes a vertical drive shaft 13 extending through the housing at the center thereof and operatively coupled to a rotor in accordance with the invention. The rotor is generally designated by numeral 14.

The general arrangement is that common to virtually all currently available power-driven lawn mowers, and it is intended therefore that the mower include a handle by which the mower may be pushed in a horizontal path toward unmown grass. The mower will also include the usual vertical adjusting means for varying the elevation of the housing with respect to the wheel axles on which the housing is supported.

Rotor 14, which includes a center shaft hole 15 and a pair of slots 16 and 17 on either side thereof, is adapted to be mounted by means of a hub connector to the end of the vertical drive shaft 13 in substitution for the standard sickle-type cutting blade. Rotor 14 is stamped or otherwise fabricated from a single sheet of metal such as steel and includes a planar hub section 18 from which three sets of blades radiate, the sets being in staggered relation.

The first set is constituted by four identical blades 19 which lie in the same plane as that of the hub and positioned with their horizontal axis at the 0°, 90°, 180° and 270° angular positions. Rotor 14 is driven in the clockwise direction, and the leading edge 19A of each blade 19 which is the cutting edge thereof is bent downwardly or pitched to define an air-foil which, as the rotor turns, creates an updraft which raises the grass blades underlying the housing to facilitate the cutting thereof and also creates a stream of air which acts to suspend and eject the cut pieces of grass.

In a preferred embodiment of the invention, the radius of hub 18 measured from the center is 5 inches and the length of blades 19 measured from the periphery of the hub to the tip of the blade is five and one-half inches.

The second set of blades 20 is at a level below the level of the first set, each blade having a step 20S at its junction with the hub as well as a pitched leading edge 20A. Blades 20 are positioned at 60°, 150°, 240°, 330° angular position. In practice, these blades have a length of four inches measured from the bottom of the step to the tip thereof. The third set of blades 21 is at a level below the level of the second step, each blade having a step 21S and a pitched leading edge 21A. These blades are positioned at 30°, 120°, 210° and 300° angular positions and have a length from step to tip of two and one-half inches. The pitched leading edges of the rotor blades also function as a reinforcing rib therefor.

Thus the sets of blades have progressively different reaches, and as the mower is advanced in a horizontal path toward unmown grass, the blades of grass, as shown in FIGS. 4, 5 and 6, are successively engaged by the sets of blades. Assuming, therefore, as shown in FIG. 4, that we have a single blade of grass G extending above the ground, first the blade 19 of the upper set will slice off the upper piece $P_1$ of the blade—for this cutting blade has the longer reach and is the first to arrive at the grass blade.

Then, as shown in FIG. 5, the cutting blade 20 of the second set, which is of intermediate length, will slice off another piece $P_2$ from the grass blade. Finally, as shown in FIG. 6, the blade 21 of the third set will slice off a piece $P_3$ from the remaining stubble of the grass blade. Because of the updraft, these pieces are caused to float and are then struck by the rotating blades which chop the floating pieces into fine particles.

The housing confines the cutting action and prevents the lateral escape of the cut pieces, except from one point. The particles fall to the ground and provide a mulch cover over the mown region. As explained previously, this is beneficial to the lawn and also does away with the need to rake and collect the cuttings.

It is important to note that the rotor lends itself to a simple die stamping operation, use being made for this purpose of a single blank of sheet metal. Each set of blades makes use of the full diameter of the blank, the blades in the second set being shorter than those in the first set because of the step therein, those of the third set being still shorter because of the greater step therein.

The leading edges of the blades are also the cutting edges thereof. In forming the airfoil, the front corner of the blade is displaced 45° downward, thereby defining a sharp edge in the plane of its movement. As shown in FIG. 3A, the cutting edge 19A' can also be sharpened conventionally, this being facilitated by the downward slope of the airfoil.

While there have been shown and described preferred embodiments of a comminuting powered lawn mower in accordance with the invention, it will be appreciated that many changes and modifications may be made therein without, however, departing from the essential spirit thereof.

Thus while rotor 14 has been described as being stamped or otherwise fabricated from a single sheet of metal which includes a hub section from which three sets of blades radiate, in practice the rotor may be injection-molded or otherwise formed of synthetic plastic material of high structural strength such as polycarbonate resin, the blades of which are provided at their leading edges with slotted sockets to receive replaceable metal cutting pieces. These pieces preferably are fabricated of steel, tungsten carbide or other metal providing a sharp cutting edge resistant to dulling.

Also, instead of forming rotor 14 from a single sheet of metal, the blade sets thereof may be constituted by separate metal components which are bolted or otherwise joined together to create a multi-level rotor assembly of the type disclosed herein.

I claim:

1. A powered lawn mower adapted to comminute grass to provide a mulch for a substantially planar grass lawn, said mower being provided with means to advance the mower in a horizontal path on said lawn toward unmown grass and comprising:

A. an inverted housing on which a motor is supported, the motor having a drive shaft extending into the housing at right angles to the plane of said lawn; and B. a rotor secured to the shaft and disposed within the housing, said rotor being constituted by a hub from which radiate three sets of blades lying in respective planes substantially parallel to the plane of said lawn, the blades in each set being 90 degrees apart, the blades of the second set being displaced 30 degrees from the blades in the first set, and the blades in the third set being displaced 30 degrees from those in the second set, the blades in these sets being at progressively decreased levels relative to the lawn, the blades in the first set having a length providing the longest reach, and the blades in the second and third sets having progressively reduced lengths, each blade having a leading edge defining a cutting edge which is pitched to form an air foil acting to create an updraft, whereby as the rotor rotates and the mower is advanced in said horizontal path toward unmown grass, the first set of blades having the longest reach act to cut pieces from the upper portions of the grass, this action being followed by the blades in the second set and then the blades in the third set, each acting to cut pieces from the grass at the level corresponding to the set level whereby each blade of grass is cut into as many pieces as there are sets.

2. A lawn mower as set forth in claim 1, wherein said three sets of rotor blades are formed by separate metal pieces.

3. A lawn mower as set forth in claim 1, wherein said rotor is molded of synthetic plastic material and the leading edges of the blades are provided with slotted sockets in which are received metal cutting pieces.

4. A lawn mower as set forth in claim 3, wherein said cutting pieces are of steel.

5. A lawn mower as set forth in claim 3, wherein said plastic material is a polycarbonate resin.

* * * * *